(12) United States Patent
Vanherck

(10) Patent No.: US 6,665,199 B2
(45) Date of Patent: Dec. 16, 2003

(54) DEVICE SUPPLIED WITH CURRENT OF LIMITED STRENGTH

(75) Inventor: Rudy Vanherck, Leuven (BE)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/897,362

(22) Filed: Jul. 2, 2001

(65) Prior Publication Data

US 2002/0018351 A1 Feb. 14, 2002

(30) Foreign Application Priority Data

Jul. 5, 2000 (EP) .......................................... 00202384

(51) Int. Cl.$^7$ .............................................. H02H 7/122
(52) U.S. Cl. .................... 363/55; 363/56.03; 363/56.05
(58) Field of Search ......................... 363/50, 55, 56.03, 363/56.05

(56) References Cited

U.S. PATENT DOCUMENTS

| | | | | |
|---|---|---|---|---|
| 4,982,306 A | | 1/1991 | Koroncai et al. | 361/58 |
| 5,715,154 A | * | 2/1998 | Rault | 363/89 |
| 5,834,924 A | * | 11/1998 | Konopka et al. | 323/222 |
| 6,009,529 A | * | 12/1999 | Park | 713/320 |
| 6,125,455 A | * | 9/2000 | Yeo | 714/14 |
| 6,445,165 B1 | * | 9/2002 | Malik et al. | 323/222 |

FOREIGN PATENT DOCUMENTS

JP 095240 A 6/2001 ............ H02M/3/28

* cited by examiner

Primary Examiner—Bao Q. Vu
(74) Attorney, Agent, or Firm—Michael E. Belk

(57) ABSTRACT

A device which can be supplied with a given DC voltage and with a current of limited strength via a supply line. A capacitor is connected to an input of the device.

13 Claims, 1 Drawing Sheet

DEVICE SUPPLIED WITH CURRENT OF LIMITED STRENGTH

BACKGROUND OF THE INVENTION

TECHNICAL FIELD

SUMMARY OF THE INVENTION

Such a device operates as a peripheral device in dependence on a control device. The two devices are interconnected by a multicore capable through which data are transmitted universally and serially, referred to as Universal Serial Bus or USB for short. The control device has a power supply part and is accordingly capable also of supplying the peripheral device with current via the multicore cable. The power supply part has a given output voltage and is capable of delivering a maximum output current level, i.e. the current is limited as to its strength. If a peripheral device is supplied with power through the cable and if it exhibits a fluctuating current consumption, then the average current consumption will be lower than the maximum possible current consumption. Consequently, the maximum possible power made available by the power supply part is not fully utilized.

It is an object of the invention to increase the average power consumption of a peripheral device supplied with current by the energy supply part without exceeding the maximum admissible current level.

According to the invention, a capacitor is connected to the input of the device. The principle is that energy is put into intermediate storage in the capacitor during those time periods in which the peripheral device requires less than the maximum possible power. The power of the peripheral device can be increased in this manner.

Advantageously, a DC-DC converter is connected upstream of the storage capacitor. The DC-DC converter converts the voltage V1 applied to the supply connection to a higher voltage V2. Whenever the consumption of the peripheral device exceeds the maximum possible power level, the storage capacitor will make good the deficit. The voltage at the storage capacitor will drop. The moment the consumption of the peripheral device drops and the supply connection makes more electric power available than is required by the peripheral device, the DC-DC converter will branch off the excess energy into the capacitor. The storage capacitor is charged again until the higher voltage V2 is achieved. By this method, current consumption peaks of the peripheral device can be higher than the maximum possible power level, while the maximum possible power made available by the power supply will never exceed the maximum. Peripheral devices which usually operate at higher voltage levels can now be used because of the higher voltage values.

Advantageously, a current limiter is connected to the input. If more power is used than the power supply part is capable of delivering, the power supply part could become damaged by an overload, or it may be switched off by a safety cut-out mechanism. The current limiter at the input of the DC-DC converter limits the input current and prevents damage to the power supply part or triggering of the cut-out mechanism.

BRIEF DESCRIPTION OF THE DRAWINGS

For better understanding, an embodiment of the invention will now be explained in more detail below with reference to the drawing, in which.

DETAILED DESCRIPTION OF THE INVENTION

Figure 1:
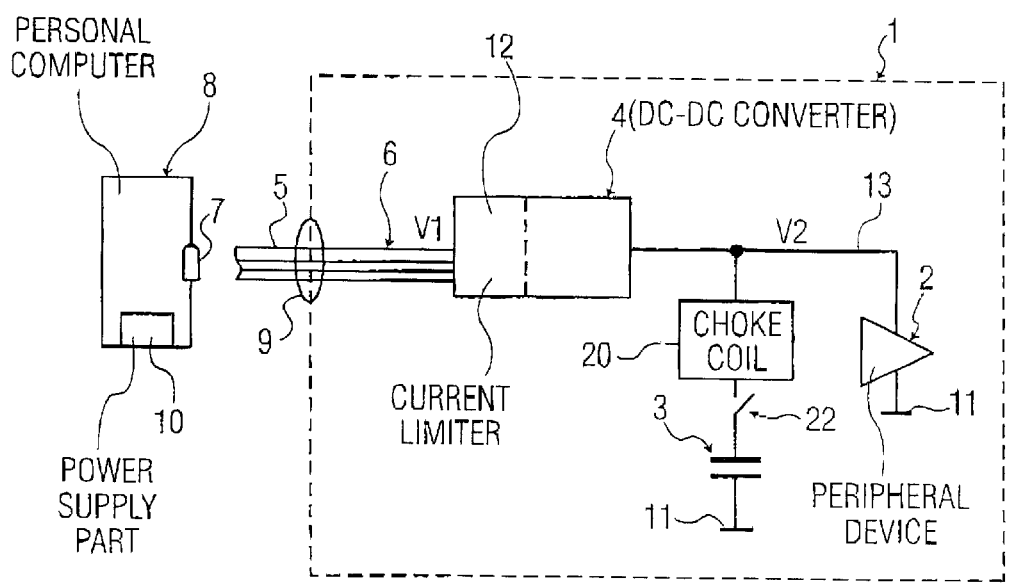
FIG. 1 shows a peripheral device with a current supply connection.

FIG. 1 is a block diagram of a circuit 1 with a peripheral device 2, also referred to as load hereinafter, with a capacitor 3 and a DC-DC converter 4. The DC-DC converter 4 is connected to a supply terminal 7 of a personal computer 8 by means of a supply line 5 inside a four-core cable 6. The supply terminal 7 is denoted the upstream port, an input 9 of the peripheral device 2 is denoted the downstream port. The computer 8 has a power supply part 10 which at a given DC voltage will supply a given maximum current. Instead of the computer 8, the peripheral device 2 may also be connected to a monitor, which also has a power supply part and operates as a USB distributor. The power supply part 10 may be constructed as a mains power part or as a supply part which derives its energy from batteries. A first voltage V1 is applied to the line 5. A current limited in its strength is supplied to the DC-DC converter 4 via the supply line 5. The DC-DC converter 4, also denoted upconverter, comprises a choke coil 20 and the capacitor 3, which are connected in series. Between the choke coil 20 and the capacitor 3 there is a switch 22 which may either close the circuit or be connected to a ground connection 11. The DC-DC converter 4 comprises a current limiter 12 in an input region. The current limiter 12 prevents more than a maximum admissible current Imax from being derived from the power supply part 10. This means that a maximum power Pmax can be calculated from the product of Imax and the voltage V1. The DC-DC converter 4 converts the voltage V1 applied to the supply line 5 to a higher voltage V2 and supplies the load 2 and the capacitor 3 with current. The capacitor 3 and the load 2 are connected in parallel and are continuously supplied with power. If the consumption of the load 2 shows a strong fluctuation, the capacitor 3 is charged whenever the consumption of the load 2 lies below the maximum possible power Pmax. If the load 2 requires more power than the supply line 5 is capable of delivering to the peripheral device 1, the capacitor 3 can supply this additional power for a short period. This means that the load 2 is capable of achieving a power lying above Pmax for a short period. This short power increase takes place in power peaks which are typically generated by audio amplifiers in the musical range. It is true that the voltage V2 across the capacitor 3, and thus on the line 13, drops during the supply of power from the capacitor, but this short-period voltage drop does not lead to additional power being required over and above the maximum possible power from the supply unit 10, whereby the supply unit 10 would be destroyed. The line 13 connects an output of the DC-DC converter 4 to an input of the load 2 and to the capacitor 3.

List of Reference Numerals 1 circuit
2 peripheral device
3 capacitor
4 DC-DC converter
5 supply line
6 cable
7 supply terminal (upstream port)
8 personal computer
9 input(downstream port)
10 power supply part
11 ground
12 current limiter 13 connection line
14 output
15 input

What is claimed is:

1. A circuit, comprising:
   a DC-DC converter;
   a first circuit path from an output node of the DC-DC-converter to ground, wherein the first circuit path comprises a device, wherein the first circuit path is totally outside of the DC-DC converter, and wherein the device can be supplied with a given DC voltage and with a current of limited strength via a supply line;
   a second circuit path from the output node of the DC-DC-converter to ground, wherein the second circuit path comprises a capacitor, wherein the second circuit path is totally outside of the DC-DC converter, and wherein the capacitor and the device are each directly connected to ground; and
   a current limiter coupled to the supply line and connected to an input node of the DC-DC converter.

2. The circuit of claim 1, wherein a choke coil is connected in series with the capacitor.

3. The circuit of claim 2, wherein a switch is connected in series between the choke coil and the capacitor.

4. The circuit of claim 1, wherein the current of limited strength is supplied by power supply part to the device via the supply line.

5. The circuit of claim 4, wherein the power supply part is comprised by a personal computer.

6. The circuit of claim 4, wherein the power supply part is comprised by a monitor.

7. The circuit of claim 4, wherein the power supply part is a mains power part or a supply part which derives its energy from batteries.

8. The circuit of claim 4, wherein if more power is consumed by the device than the maximum power that the supply line is capable of delivering to the device then the current limiter limits the current so as to prevent damage to the power supply part.

9. The circuit of claim 1, wherein if the device requires more power than the maximum power that the supply line is capable of delivering to the device, then the capacitor is adapted to supply the device with additional power, and wherein the additional power is derived from charge that stored within the capacitor.

10. The circuit of claim 1, wherein the average power consumption of the device exceeds the what the avenge power consumption of the device would be if the capacitor were not connected to the device.

11. A circuit, comprising:
    a device which can be supplied with a given DC voltage and with a current of limited strength via a supply line;
    a capacitor connected to an input of the device such that the capacitor and the device are each directly connected to ground;
    a DC-DC converter connected to the input of the device, wherein the capacitor and the device are located in respective parallel circuit paths between an output node of the DC-DC converter and ground;
    a choke coil connected in series with the capacitor;
    a switch connected in series between the choke coil and the capacitor; and
    a current limiter connected upstream of the DC-DC converter.

12. The circuit of claim 11, wherein the current of limited strength is supplied by power supply part to the device via the supply line.

13. The circuit of claim 12, wherein the power supply part is comprised by a personal computer.

* * * * *